Inventor:
George F. Skala,
by Charles W. Helzer
His Attorney.

United States Patent Office 3,503,711
Patented Mar. 31, 1970

3,503,711
AMMONIA DETECTION APPARATUS
AND METHOD
George F. Skala, Scotia, N.Y., assignor to General Electric
Company, a corporation of New York
Filed Dec. 23, 1965, Ser. No. 516,013
Int. Cl. G01n 31/00, 33/00
U.S. Cl. 23—232
10 Claims

ABSTRACT OF THE DISCLOSURE

An apparatus for detecting the presence of small amounts of ammonia in a gas such as air is disclosed wherein the gas-ammonia mixture is treated with a corona discharge before it is exposed to acid vapor to form ammonium salt condensation nuclei which are then detected and measured, or wherein an ammonia-free gas is treated with a corona discharge and then mixed with the ammonia containing gas before exposure to the acid vapor. The use of the corona treatment increases the sensitivity of the instrument by a factor of ten or more.

---

This invention relates to a method and apparatus useful in ammonia detection and more specifically to an improved method and apparatus for converting ammonia gas into ammonium-salt solid particles, the principal application being in an ammonia detecting system.

One known means for detecting the presence of ammonia gas is to convert the gas into solid particles in an acid-base reaction and then to detect the presence of the solid particles. This can be done by introducing the ammonia gas into an atmosphere of, for example, HCl vapor to form very small solid ammonium chloride particles or nuclei and then detecting the nuclei by means of a condensation nuclei detector. A condensation nuclei detector is a device in which air, which may contain very small solid particles or nuclei, is introduced into a supersaturated air mixture. In this state water particles condense from the humid air around the nuclei being detected. The resultant water particle is large enough to be detected by light scattering techniques or any other suitable means.

In present day ammonia converters unsatisfactory results are obtained due to the fact that the acid-base reaction in the converter, which combines the ammonia vapor with the acid vapor to form ammonium-salt particles has not yielded a large enough number of particles. When only a small number of particles are formed, the ability of the condensation nuclei detector to detect the particles is decreased and, therefore, the sensitivity of the ammonia detecting system is reduced. By means of this invention the yield of particles from an ammonia converting device is greatly increased to provide an ammonia detector of increased sensitivity.

It is therefore an object of this invention to obtain an ammonia detecting device of increased sensitivity.

It is another object of this invention to provide an ammonia converting device which yields a greater number of nuclei per volume of ammonia gas.

Briefly these objects are obtained in a device which includes means for creating a corona discharge in the area of an air flow which contains, or which will eventually contain, the ammonia gas to be detected. For reasons as yet not fully understood the corona discharge acting on the ammonia gas bearing air flow serves to increase the yield of nuclei.

These objects and other advantages of my invention will be apparent to one skilled in the art after reference is made to the following description of a preferred embodiment of my invention when taken in connection with the accompanying drawings in which.

Figure 1:
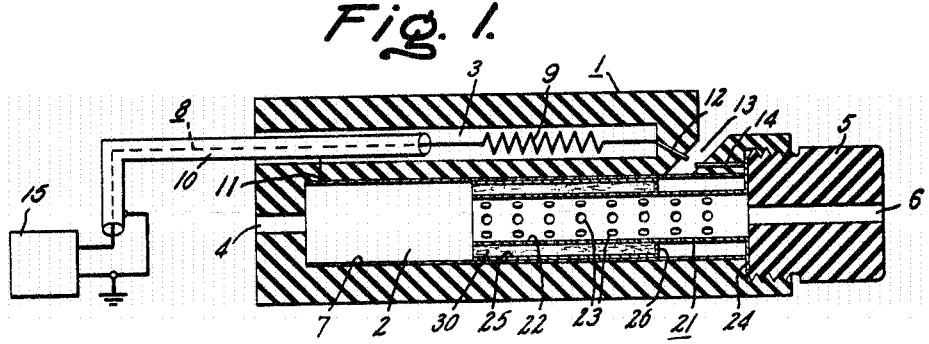
FIG. 1 is an apparatus employing the essential elements of my invention which yields a greater number of ammonium-salt nuclei than prior ammonia gas conversion devices.

Referring now to FIG. 1, a housing 1 for the ammonia converter according to this invention, shown in cross section, is designed to include an inner chamber 2 and an outer passageway 3. The housing 1 may be comprised of any suitable non-conductive, non-corrosive material such as Teflon. The acid-base reaction is carried out in the inner chamber 2 and the inner chamber may be cylindrical in shape. At least one small cylindrical opening 4 at the left end of the chamber 2 allows products of the acid-base reaction to leave the chamber 2. A threaded plug member 5 closes the right end of the chamber 2 and includes an axial opening 6 for introducing air bearing ammonia gas to be detected into the chamber 2. By unscrewing the threaded plug member 5, access to the inner chamber 2 is facilitated. The inner surface 7 of the chamber is covered with a conductive layer which may comprise any suitable conductive material and, in a preferred embodiment, comprises a layer of non-corrosive tantalum foil.

The outer passageway 3 is adapted to contain a shielded electrical conductor 8 and a series connected voltage dropping resistor 9 and may comprise a cylindrical hole beginning at the left end of the housing 1 and extending parallel to the inner chamber 2 to a location between the center and the right end of the housing 1. The structure of the passageway 3 is only a matter of design, its function merely being to contain the shielded conductor 8. The shield 10 of the conductor 8 is electrically connected to the tantalum foil layer 7 by means of a conductor 11. The right end of the resistor 9 is connected to a corona discharge point 12, preferably platinum, which extends through a portion of the housing 1 into a slanting passageway 13. In a similar manner to the opening 6 the slanting passageway 13 is adapted to allow ammonia gas bearing air to enter the inner chamber 2. Another corona discharge point 14, also preferably platinum, is employed and extends through another part of the housing 1 so that its tip also projects into the slanting pasageway 13 directly across from the tip of the corona point 12. The corona discharge point 14 terminates in electrical contact with the layer 7 in a manner to be described hereinafter. The conductor 8 is connected to the high voltage terminal of a source 15 of high voltage and the shield 10, layer 7 and point 14 are connected to ground. The source 15 may suitably be a D.C. generator of 7000 volts. Thus a corona discharge path exists between the corona points 12 and 14.

Figure 2:
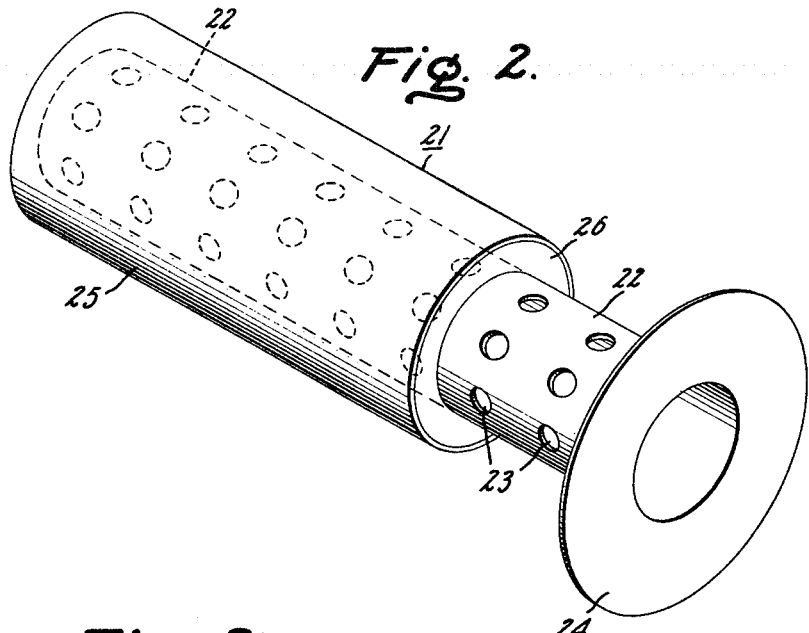
FIG. 2 is a perspective view of one of the internal elements of the apparatus shown in FIG. 1.

A cylindrical member 21, which is more clearly viewed in FIG. 2, is placed within the inner chamber 2 and extends longitudinally from the right end of the chamber 2 to a point somewhere near its center. FIG. 2 shows the cylindrical member 21 comprising an inner hollow cylinder 22, preferably comprised of tantalum, which includes a plurality of perforations 23 and a circular flange 24. Concentric with and surrounding the left hand portion of the cylinder 22 is an outer cylinder 25, also preferably tantalum, positioned on the cylinder 21 such that its right-hand end 26, as shown in FIG. 2, is positioned just to the left of the opening between the slanting passageway 13 and the inner chamber 2. The flange 24 extends between the inner surface of the plug 5 and a portion of the housing 1 where the corona point 14 terminates and also contacts the inner surface 7 of the chamber 2. By this means electrical contact is established between the corona point 14, the cylindrical member 21, and the grounded tantalum layer 7. Removal of the plug 5 facilitates removal of the cylindrical member 21 for cleaning or replacement. The cylindrical volume between the inner cylinder 22 and the outer cylinder 25 is filled with a substance 30 suitable to contain the reacting acid in liquid form. Substance 30 also serves to mechanically support outer cylinder 25 in concentric relationship with respect to inner cylinder 22 with the assistance of some welded tabs. The outer cylinder 25 is press fit against the inner conductive layer 7 of chamber 2 and closes off the right side of chamber 2 from the left side. In a preferred embodiment the substance 30 may comprise a wick preferably made from a synthetic polyester fiber such as Dacron fiber, and the acid may comprise HCl. By evaporation hydrogen chloride vapor evolves from the wick 30 through the perforations 23 into the interior of the cylinder 22. The tantalum metal of the various internal parts prevents corrosion from occurring due to the hydrochloric acid.

In the operation of the ammonia converter according to this invention, an air flow enters the chamber 2 through the slanting passageway 13 or through both the passageway 13 and the passageway 6. The air flow may be initiated by means of a vacuum produced in a condensation nuclei detector 40 shown in FIG. 3 connected to the housing 1 at the outlet opening 4. The air flow entering the chamber 2 may be air in the atmosphere or air in a discrete volume desired to be monitored. Any ammonia gas present in the air stream will also enter the chamber 2 through either of the passageways 13 or 6. It does not matter in the general application of this invention whether the ammonia enters the chamber 2 through the passageway 13 or the passageway 6, just so long as either an air flow containing the ammonia gas or a clean airstream is introduced through the passageway 13 past the corona discharge points 12 and 14. As the air flow, which may or may not contain ammonia, passes through the passageway 13, a discharge is maintained between the corona discharge points 12 and 14. The flow of air passing the corona arc then enters the interior of the cylinder 22 through the perforations 23 and mixes with the flow of air coming through the passageway 6 in the plug 5. The mixture of air and ammonia then travels lengthwise through the interior of the cylinder 22 from right to left as illustrated in FIG. 1 until it comes in contact with the hydrogen chloride vapor evolving from the Dacron wick 30. Here a chemical reaction ensues wherein very small ammonium chloride particles are formed due to the much lower vapor pressure of the salt than either of the combining constituents.

Figure 3:
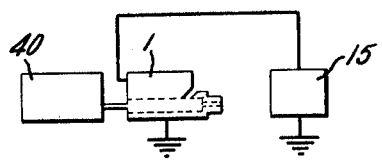
FIG. 3 is a system diagram of an ammonia detector employing this invention.

After the acid-base reaction in the interior of the cylinder 22 has been carried out, the ammonium chloride particles are carried by the air flow through the remainder of the inner chamber 2 in the housing 1 and through the passageway 4 to the detecting device which may be condensation nuclei detector 40 shown in FIG. 3. The detection of nuclei by the condensation nuclei detector will indicate the presence of ammonia gas in the air flow introduced through either the passageway 13 or the passageway 6. Although the method of utilizing an acid-base reaction in an ammonia converter for a detecting device has been known, applicant has discovered that the percentage yield of ammonium chloride particles can be increased by a factor of ten or more if at least part of the air flow has been subjected to the corona arc discharge.

In order to insure that the ammonium chloride particles, which can be electrically charged very highly due to the corona arc, do not become electrostatically attracted to the sides of the chamber 2 and the cylindrical member 21, electric field gradients within the chamber 2 are avoided due to the interior metal parts being grounded by means of the conductor 11.

It is not known at this time exactly why the tremendous increase in yield of ammonium chloride nuclei is caused by the corona arc discharge. The answer to this question very likely may be one or more of the following three theories: The first theory is that the corona arc ionizes the air flow thereby creating many atomic size ions upon which nuclei resulting from the acid-base reaction grow. This results in the creation of a larger number of nuclei, each one being smaller than if no ions were present, producing a much higher nuclei concentration. A second theory that may answer the question of why a higher yield is gained by means of the corona arc is that the very high electric field caused by the potential difference between the corona points 12 and 14 causes the energy levels of the ammonia molecules to increase thereby increasing their affinity for combining with the chlorine atoms in the acid-base reaction. A third theory is that the platinum corona points 12 and 14 act as catalysts in the acid-base reaction in some manner not presently known.

There appears to be evidence that the former theory, i.e., that ions formed by the corona arc tend to increase the concentration of nuclei formed in the acid-base reaction, is preferred over the other two theories. This preference is due to the fact that it does not appear to make any difference whether the ammonium gas is introduced into the chamber 2 through the passage 13 or through the passageway 6. The only criterion is that before the acid-base reaction ensues, the ammonia must mix with air which has been subjected to the corona arc discharge by a corona discharge means positioned in at least one of the inlet openings. Since this is true, it is likely that the latter two theories, both of which involve a direct reaction between the ammonium gas and either the corona arc or the corona arc points 12 and 14, are not the prevalent cause for the increased yield. At any rate, applicant does not intend to be limited to any one of these three theories; they are set forth only as a possible explanation for the increased yield resulting from applicant's invention.

Thus, applicant has developed an improved ammonia converter which yields a much higher increase in ammonium chloride nuclei formed thereby increasing the sensitivity of the device as an ammonia detector. While this invention has been described in terms of the preferred embodiment, the principle underlying the invention will suggest many modifications of this embodiment to those skilled in the art. Therefore, it is desired that the appended claims not be limited to the desired embodiment but rather should encompass all such modifications as fall within the spirit and scope of this invention.

What I claim as new and desire to secure by Letters Patent of the United States is:

1. An ammonia converter comprising:
   (a) a housing including an interior chamber;
   (b) means for introducing air containing ammonia gas into said chamber;
   (c) means for subjecting at least part of the air as it is introduced into said chamber to a corona discharge;
   (d) means in said chamber for evolving acid vapor so that ammonia gas introduced into said chamber combines therewith producing ammonium-salt particles.

2. An ammonia converter comprising:
   (a) a housing including an interior chamber, said interior chamber containing inlet and outlet openings for allowing air to flow therethrough;
   (b) means for initiating an air flow through said chamber, some of the air flow containing ammonia gas;
   (c) a source of high electrical voltage;
   (d) a corona discharge means positioned in said inlet and connected to said source for subjecting at least part of the air flow to a corona arc produced by said corona discharge means;
   (e) means positioned in said interior chamber for evolving hydrochloric acid vapor so that ammonia gas introduced into said interior chamber combines therewith to produce ammonium chloride particles.

3. An ammonia converter comprising:
(a) a housing including an interior chamber;
(b) a plurality of inlet openings and at least one outlet opening connecting said interior chamber with the exterior of said housing for permitting an air flow through said interior chamber, the ammonia gas to be converted being introduced into said chamber through at least one of said inlet openings;
(c) a source of high electrical voltage;
(d) a corona discharge means positioned in at least one of said inlet openings to subject the air flowing therethrough to a corona arc;
(e) means positioned in said interior chamber for evolving hydrochloric acid vapor so that ammonia gas introduced into said interior chamber combines therewith to produce ammonium chloride particles.

4. The ammonia converter as described in claim 3 wherein said means for evolving hydrochloric acid vapor comprises means for containing liquid hydrochloric acid and means for allowing hydrochloric acid vapor produced by evaporation of said liquid hydrochloric acid to evolve into the air flow through said interior chamber.

5. The ammonia converter as described in claim 4 wherein said means for containing liquid hydrochloric acid includes an absorbent material adapted to be saturated with liquid hydrochloric acid.

6. The ammonia converter as described in claim 3 wherein said evolving means includes a hollow electrically conductive member, the air flow being propagated through the hollow portion thereof, means for maintaining said member at a uniform electric potential with respect to said corona discharge means thereby avoiding electric field gradients in said interior chamber.

7. The ammonia converter as described in claim 3 wherein the metal parts of the converter are comprised of corrosion resistant material.

8. The converter of claim 7 wherein said corrosion resistant material comprises tantalum.

9. An ammonia gas detecting means including:
(a) a housing including an interior chamber;
(b) means for introducing air containing ammonia gas into said chamber;
(c) means for subjecting at least part of the air as it is introduced into said chamber to a corona discharge;
(d) means for evolving acid vapor so that ammonia gas introduced into said chamber combines therewith to convert the ammonia gas into ammonium-salt particles; and
(e) means for detecting the ammonia-salt particles so produced.

10. The method of detecting ammonia gas by converting it into a plurality of ammonium chloride particles comprising the steps of:
(a) introducing the ammonia gas to be converted into a confined volume by means of an air flow;
(b) subjecting at least part of the air flowing into the confined volume to a corona discharge as it enters said volume;
(c) mixing all of the air flowing into the confined volume;
(d) subjecting the mixed ammonia gas bearing air to hydrogen chloride vapor to allow the ammonia gas to combine with chlorine atoms in the hydrogen chloride vapor to form ammonium chloride particles; and
(e) detecting the ammonium chloride particles so formed.

References Cited

UNITED STATES PATENTS

| 2,468,175 | 4/1949 | Cotton | 204—312 |
| 2,583,898 | 1/1952 | Smith | 204—164 |
| 2,897,059 | 7/1959 | Van Luik. | |
| 3,005,762 | 10/1961 | Fenn | 204—164 |
| 3,117,841 | 1/1964 | Van Luik et al. | 23—232 |
| 3,152,056 | 10/1964 | Berghaus et al. | 204—177 |

OTHER REFERENCES

Van Luik et al.: Analytical Chemistry, vol. 34, pp. 1617–1620 (November 1962).

JOSEPH SCOVRONEK, Primary Examiner

U.S. Cl. X.R.

23—100, 230, 252, 254; 204—164, 312